US011134428B2

(12) United States Patent
Ayoub et al.

(10) Patent No.: US 11,134,428 B2
(45) Date of Patent: Sep. 28, 2021

(54) VEHICLE CELLULAR CONNECTIVITY CONTROL

(71) Applicant: FORD GLOBAL TECHNOLOGIES, LLC, Dearborn, MI (US)

(72) Inventors: Issam Ayoub, Royal Oak, MI (US); Said Abdallah, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 99 days.

(21) Appl. No.: 16/512,527

(22) Filed: Jul. 16, 2019

(65) Prior Publication Data

US 2021/0022068 A1 Jan. 21, 2021

(51) Int. Cl.
| | |
|---|---|
| *H04W 56/00* | (2009.01) |
| *H04W 48/02* | (2009.01) |
| *H04W 48/16* | (2009.01) |
| *H04W 8/18* | (2009.01) |
| *H04W 8/24* | (2009.01) |
| *H04W 4/40* | (2018.01) |
| *H04W 88/18* | (2009.01) |
| *H04M 7/00* | (2006.01) |
| *H04W 88/06* | (2009.01) |
| *H04W 68/00* | (2009.01) |

(52) U.S. Cl.
CPC ......... *H04W 48/02* (2013.01); *H04M 7/0021* (2013.01); *H04W 4/40* (2018.02); *H04W 8/18* (2013.01); *H04W 8/245* (2013.01); *H04W 48/16* (2013.01); *H04W 68/005* (2013.01); *H04W 88/06* (2013.01); *H04W 88/18* (2013.01)

(58) Field of Classification Search
CPC ......... H04W 48/02; H04W 4/40; H04W 8/18; H04W 8/245; H04W 48/16; H04W 68/005; H04W 88/06; H04W 88/18; H04M 7/0021
USPC ....................................................... 370/329
See application file for complete search history.

(56) References Cited

U.S. PATENT DOCUMENTS

| | | | |
|---|---|---|---|
| 8,032,111 B2 | 10/2011 | Dunne et al. | |
| 8,781,442 B1* | 7/2014 | Link, II | H04W 12/06 455/411 |
| 9,398,397 B2 | 7/2016 | Petersen et al. | |
| 10,096,176 B1* | 10/2018 | Namineni | G06Q 10/02 |
| 2010/0235285 A1* | 9/2010 | Hoffberg | G06Q 20/401 705/75 |

(Continued)

*Primary Examiner* — Sai Ming Chan
(74) *Attorney, Agent, or Firm* — Michael J. Spenner; Brooks Kushman P.C.

(57) ABSTRACT

A system for a vehicle includes a modem and a telematics controller. The modem is configured to operate in a normal service mode in which the modem connects to a mobile network whenever possible according to a subscriber identity module (SIM) configuration of the modem, and in an emulated limited service mode in which the modem emulates network conditions of a limited service mode by refraining from providing data or voice connectivity outside of emergency services. The telematics controller is programmed to responsive to receipt of an indication to transition from the normal service mode to the limited service mode, wait for any active data or voice connections to the mobile network to terminate, and responsive to termination of any active data or voice connections to the mobile network, transition the modem from the normal mode to the emulated limited service mode.

19 Claims, 3 Drawing Sheets

(56) References Cited

U.S. PATENT DOCUMENTS

2020/0204982 A1\* 6/2020 Ruvalcaba .............. H04W 8/04
2020/0374766 A1\* 11/2020 Veloso .................. H04W 36/30

\* cited by examiner

VEHICLE CELLULAR CONNECTIVITY CONTROL

TECHNICAL FIELD

The present disclosure relates to aspects of control of vehicle cellular connectivity. In particular, the disclosure relates to addition of a "limited service" mode to operation of a vehicle modem to allow for the selective emulation of connectivity of the modem during limited service.

BACKGROUND

Telematics services bring many useful services to end customers. These services may include, for example, turn-by-turn directions, vehicle health reports, vehicle tracking, fleet management, and over-the-air software updates. Telematics, by its nature, requires the capture, storage, and exchange of data to perform these and other services. Such data may include personal or sensitive information, which may require appropriate handling. In some cases, end customers may not wish to have such data be collected, despite the effect this may have on the ability of the customer to enjoy the use of telematics services.

SUMMARY

In one or more illustrative examples, a system for a vehicle includes a modem and a telematics controller. The modem is configured to operate in a normal service mode in which the modem connects to a mobile network whenever possible according to a subscriber identity module (SIM) configuration of the modem, and in an emulated limited service mode in which the modem emulates network conditions of a limited service mode by refraining from providing data or voice connectivity outside of emergency services. The telematics controller is programmed to responsive to receipt of an indication to transition from the normal service mode to the limited service mode, wait for any active data or voice connections to the mobile network to terminate, and responsive to termination of any active data or voice connections to the mobile network, transition the modem from the normal mode to the emulated limited service mode.

In one or more illustrative examples, a method for a vehicle includes receiving an indication to transition from a normal service mode, in which a modem of a vehicle connects to a mobile network whenever possible according to a subscriber identity module (SIM) configuration, to an emulated limited service mode, in which the modem emulates network conditions of a limited service mode by refraining from providing data or voice connectivity outside of emergency services; responsive to receipt of the indication, waiting for any active data or voice connections to the mobile network to terminate; and responsive to termination of any active data or voice connections to the mobile network, transitioning the modem from the normal mode to the emulated limited service mode.

In one or more illustrative examples, a system includes a modem configured to maintain in non-volatile storage, a value indicative of whether the modem is operating in a normal service mode in which the modem connects to a mobile network whenever possible according to a subscriber identity module (SIM) configuration or an emulated limited service mode in which the modem emulates network conditions of a limited service mode by refraining from providing data or voice connectivity outside of emergency services, and expose a modem application programming interface (API) from which a first function is exposed to allow access to getting the value and a second function is exposed to allow access to setting the value. The system further includes a vehicle human-machine interface, including a toggle control for switching between the normal service mode or the emulated limited service, wherein a state of the toggle control is set by the vehicle human-machine interface responsive to a query of the modem API for a status of whether the modem is in the normal service mode or the emulated limited service mode. The system further includes a telematics controller programmed to receive an indication from the toggle control to transition from the normal service mode to the emulated limited service mode, responsive to receipt of the indication, wait for any active data or voice connections to the mobile network to terminate, wherein the wait for any active data or voice connections to the mobile network to terminate is capped by a predefined maximum time regardless of whether all active data or voice connections are terminated, responsive to termination of any active data or voice connections to the mobile network or expiration of the wait, transition the modem from the normal mode to the emulated limited service mode using the modem API, receive a second indication from the toggle control to transition from the emulated limited service mode to the normal service mode, and responsive to receipt of the second indication, transition the modem from the emulated limited service mode to the normal mode using the modem API.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The introduction of connected vehicles brings useful features to end customers. Yet, such features may cause some of the customers to worry about privacy (e.g., the vehicle being tracked through its connection to the cellular network). In some markets, there are regulatory requirements with respect to the use of vehicle data (e.g., GDPR in Europe). Therefore, it may be desirable to provide the customers with a very user-friendly way to turn vehicle connectivity off, as well as allowing the customers to turn connectivity back on and use the telematics services with a push of a button. Such an option may be useful to maintain a good take rate or keep rate for telematics services.

Additionally, with the market direction turning to complete rollout of connected vehicles, in some markets legal requirements for data localization may prevent the offering of telematics services without a service delivery network (SDN) deployed in that market. At the same time, emergency call services may be mandated. As discussed in further detail herein, a "limited service" mode may be implemented with the vehicle telematics control unit (TCU) at assembly, which may allow the user to configure the use of connectivity in the vehicle.

Figure 1:
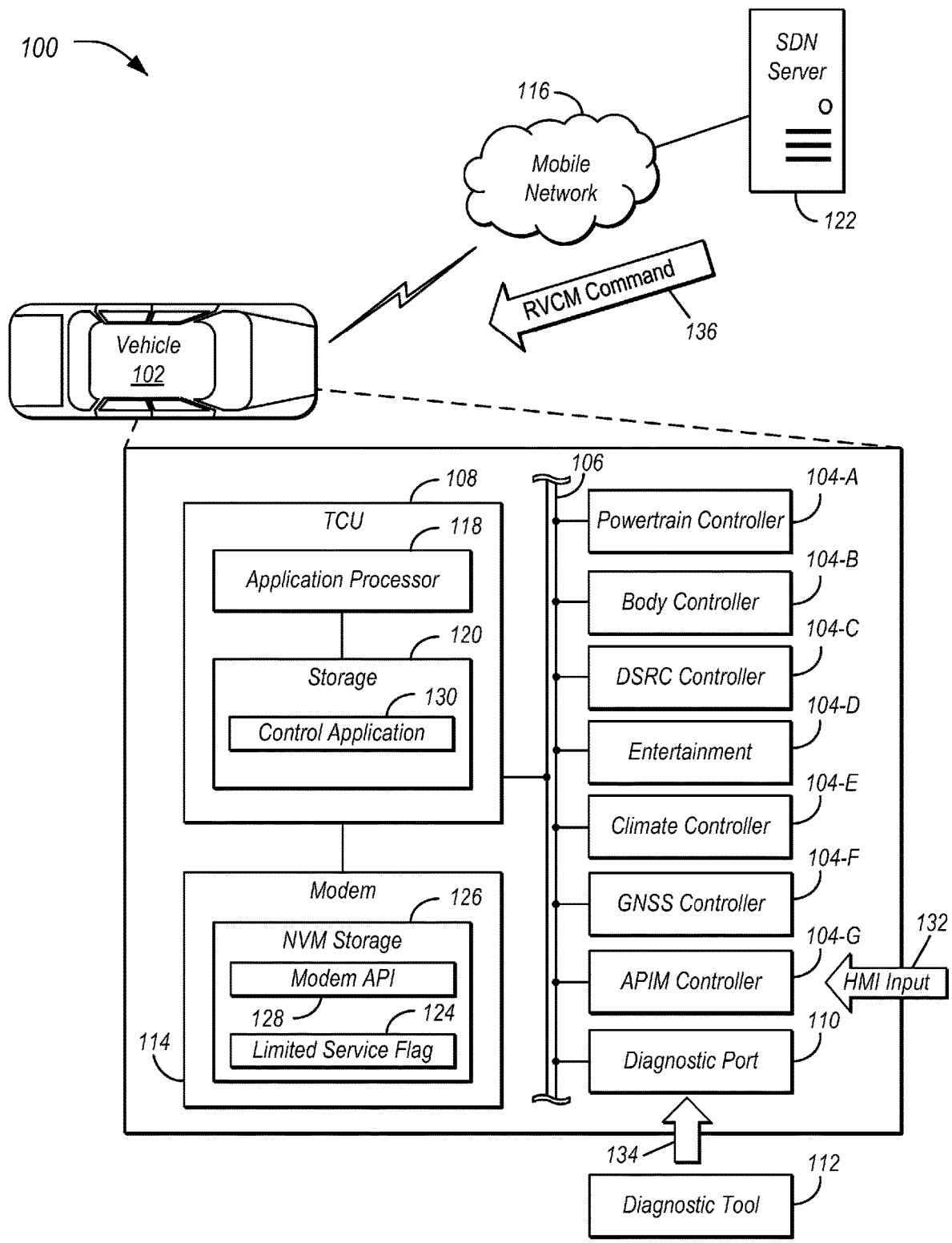
FIG. 1 illustrates an example system implementing a "limited service" mode for telematics services of the vehicle.

FIG. 1 illustrates an example system 100 implementing a "limited service" mode for telematics services of the vehicle 102. As illustrated, the vehicle 102 includes a plurality of vehicle controllers 104 in communication over a vehicle bus 106. The system 100 also includes a SDN server 122 configured to communicate with a TCU 108 of the vehicle 102 over a mobile network 116. The TCU 108 may utilize a control application 130 installed to a storage 120 of the TCU 108 to configure a modem 114 to be either in a "normal service" mode in which the modem 114 connects to the mobile network 116 whenever possible according to the subscriber identity module (SIM) configuration, and a "limited service" mode in which the modem 114 refrains from providing data or voice connectivity outside of emergency services. The modem 114 may include a modem network access device interface (NADIF) application programming interface (API) 128 to allow the TCU 108 to configure the mode of the modem 114 to be in either the "normal service" mode or the "limited service" mode. The modem 114 may maintain this state information in a limited service flag 124 stored to non-volatile memory storage 126 of the modem 114. The TCU 108 may be configured to determine which mode to set the modem 114 to be based on HMI input 132 to a vehicle 102 HMI provided by the APIM controller 104-G, based on diagnostic input 134 received from a diagnostic tool connected to the vehicle bus 106, or based on a remote vehicle configuration manager (RVCM) command 136 received over the mobile network 116 from the SDN server 122. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As yet a further possibility, the vehicle 102 may be an electric vehicle (EV) powered by one or more electric motors. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and an accessory protocol interface module (APIM) controller 104-G may be configured to receive user input to a human-machine interface (HMI) via various buttons, touchscreens, or other controls, as well as provide vehicle status information to a driver, such as fuel level information, engine operating temperature information, and current location of the vehicle 102.

The vehicle bus 106 may include various methods of communication available between the controllers 104, as well as between the TCU 108 and the vehicle controllers 104. As some non-limiting examples, the vehicle bus 106 may include one or more of a vehicle controller area network (CAN), an Ethernet network, and a media-oriented system transfer (MOST) network.

A diagnostic port 110 may provide an interface whereby dealers, mechanics, owners, and/or third parties (such as insurance companies), can plug devices into a vehicle 102 to access information on and provide information to the vehicle. In an example, the diagnostic port 110 may be an on-board diagnostics (OBD) port connected to the vehicle bus 106. A diagnostic tool 112, such as a dongle, code reader, or other scan device may be connected to the diagnostic port 110. Once connected, the diagnostic tool 112 may use the connection provided by the diagnostic port 110 to gain access to messages traversing the vehicle bus 106. Accordingly, the diagnostic tool 112 can capture diagnostic codes, monitor vehicle health, or, in some cases, adjust vehicle settings.

The TCU 108 may include network hardware configured to facilitate communication between the vehicle controllers 104 and with other devices of the system 100. For example, the TCU 108 may include or otherwise access a cellular modem 114 configured to facilitate communication with a mobile network 116. The mobile network 116 may include a plurality of interconnected cells that form a cellular network maintained by a cellular network provider. The mobile network 116 may also provide for interconnection of the cellular network with other communication networks, such as the Internet, a cable television distribution network, a satellite link network, a local area network, and a telephone network, as some non-limiting examples.

The TCU 108 may further include various types of computing apparatus in support of performance of the functions of the TCU 108 described herein. In an example, the TCU 108 may include one or more processors 118 configured to execute computer instructions, and a storage 120 medium on which the computer-executable instructions and/or data may be maintained. A computer-readable storage medium (also referred to as a processor-readable medium or storage 120) includes any non-transitory (e.g., tangible) medium that participates in providing data (e.g., instructions) that may be read by a computer (e.g., by the processor(s)). In general, the processor 118 receives instructions and/or data, e.g., from the storage 120, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The SDN server 122 may include various types of computing apparatus, such as a computer workstation, a server, a desktop computer, a virtual server instance executed by a mainframe server, or some other computing system and/or device. Similar to the TCU 108, the SDN server 122 generally includes a memory on which computer-executable instructions may be maintained, where the instructions may be executable by one or more processors (not shown for clarity). Such instructions and other data may be stored using a variety of computer-readable media.

In the limited service mode, the modem 114 may camp on a cell but is not registered to the mobile network 116. In such a mode, only emergency calls are allowed. Data connections and non-emergency calling may not be performed. The modem 114 may enters this state, for example, when no SIM card is inserted, or a PIN has not been given, when neither home mobile network 116 nor any other allowed mobile networks 116 are found, when a registration request was not answered or denied by the mobile network 116 (e.g., via AT+CREG commands), or when authentication of the modem 114 to the mobile network 116 has failed.

The "limited service" flag 124 may be a non-volatile memory (NVM) item within the embedded file system (EFS) of the modem 114. When the "limited service" flag 124 of the modem 114 is set, the modem 114 emulates being in the "limited service" mode. This allows for data connections and non-emergency calling to be prevented. When the "limited service" flag 124 of the modem 114 is not set, while the SIM is configured in normal service with both data and voice (including emergency calls) services enabled, the modem 114 will determine its operation mode based on the value of the "limited service" flag 124, bypassing the SIM configuration.

The control application 130 may be one application included on the storage 120 of the TCU 108. When executed by the processor 118, the control application 130 may be programmed to configure the mode of the modem 114 to be in either the "normal service" mode or the emulated "limited service" mode. By utilizing the control application 130, the TCU 108 may be enhanced with the ability to set or unset emulation of the "limited service" operation mode of the modem 114, regardless of the actual SIM configuration that is controlled by the mobile network provider.

In an example, the control application 130 may reside on an application processor 118 of the TCU 108. When executed by the application processor 118, the control application 130 may determine the desired emulation status and request the modem 114 to emulate that status through a modem API 128 call controlling whether to set the emulation mode of the modem 114. Using the modem API 128, the control application 130 may be programmed to write to the "limited service" flag 124 NVM item within the EFS to set it to either "limited service" mode or "normal service" mode. The control application 130 may also be programmed to inquire the current emulation status from the modem 114 using another API call of the modem API 128. Accordingly, the control application 130 may be able to control vehicle cellular connectivity, without intervention from the mobile network operator.

The control application 130 may be further programmed to tie the configuration of the "limited service" flag 124 to a data identifier (DID), which may be referred to as the operation mode DID. The value of the operation mode DID may be configured in various ways. As some examples, the control application 130 of the TCU 108 may be configured to determine which mode to set the modem 114 based on vehicle bus 106 signaling indicative of HMI input 132 to a vehicle 102 HMI provided by the APIM controller 104-G, based on diagnostic input 134 received from a diagnostic tool 112 connected to the vehicle bus 106, or based on a RVCM command 136 received over the mobile network 116 from the SDN server 122. When a customer turns the vehicle connectivity on or off via the HMI, the APIM controller 104-G may send a signal to the TCU 108 over the vehicle bus 106 reflecting the new status of the vehicle connectivity. The control application 130 may process the received vehicle bus 106 signal and update the value of the "limited service" flag 124 accordingly. Similarly, the control application 130 may update the value of the "limited service" flag 124 responsive to changes via diagnostic input 134 or via RVCM command 136.

Provided a null initial status, the control application 130 may evaluate the received value of the operation mode DID. If the value is "Limited Service", the control application 130 may check whether the modem 114 has an ongoing active data or voice session. If so, the control application 130 may wait until all sessions are gracefully terminated before proceeding with the process.

When no active session is detected, the control application 130 may, using the modem API 128, request the modem 114 to emulate the "limited service" operation mode regardless of the configuration written to the modem 114 SIM by the mobile network operator (MNO), and save the emulation status to the "limited service" flag 124 NVM item. While in this emulated "limited service" mode, the modem 114 may block outgoing and incoming traffic on the air interface except for those related to an emergency event. If the received value is "Normal Service," the control application 130 may verify that the modem 114 has no ongoing traffic exchange or active sessions (otherwise, the control application 130 may wait until active sessions are gracefully terminated before proceeding). Once verified, the control application 130 may then use the modem API 128 to request the modem 114 to return to the "Normal Service" operation mode, and save this normal status to the "limited service" flag 124 NVM item. While in this mode, services may be resumed.

Figure 2A:
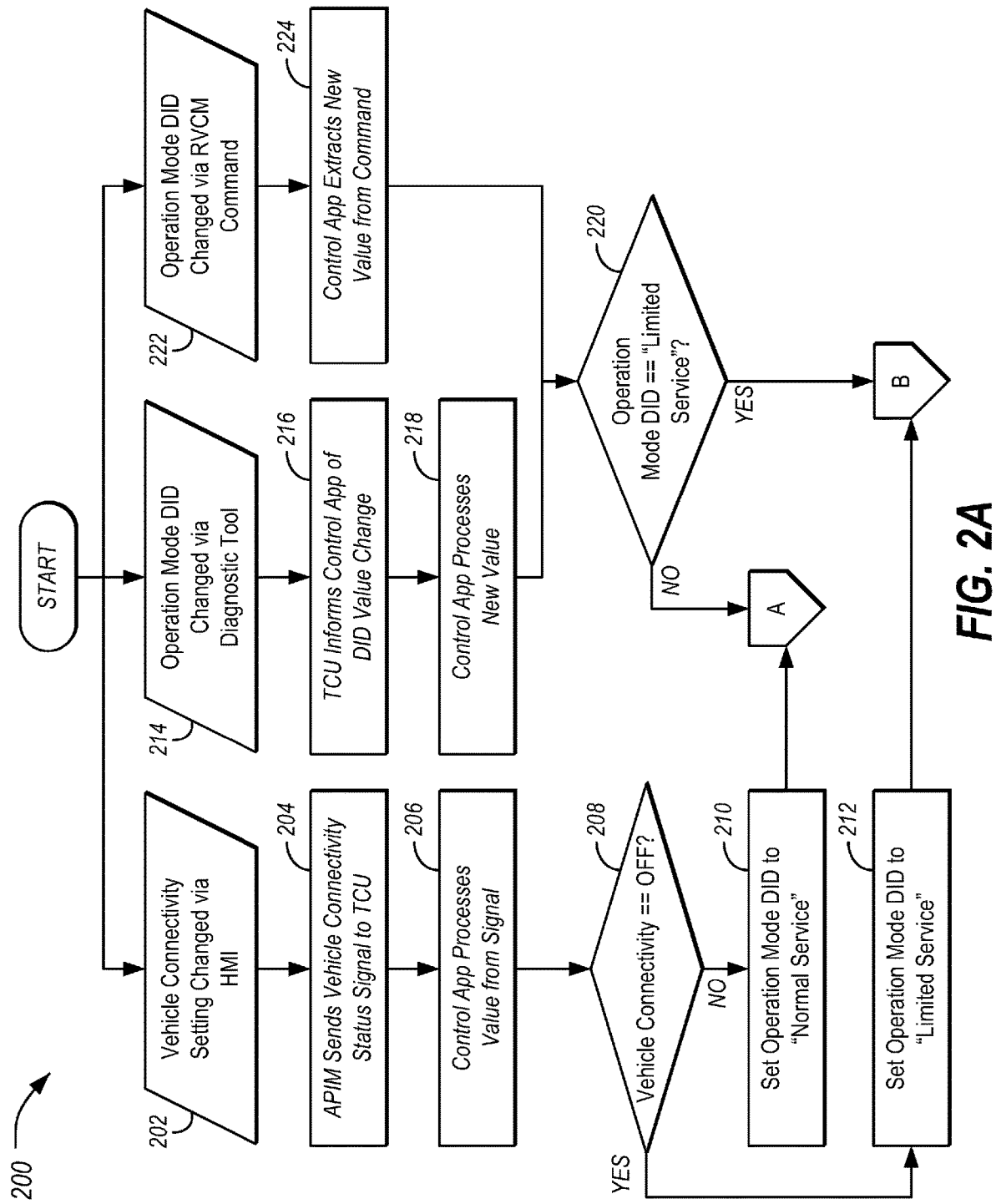
FIG. 2A illustrates an example portion of a process for implementing a "limited service" mode for telematics services of the vehicle.
Figure 2B:
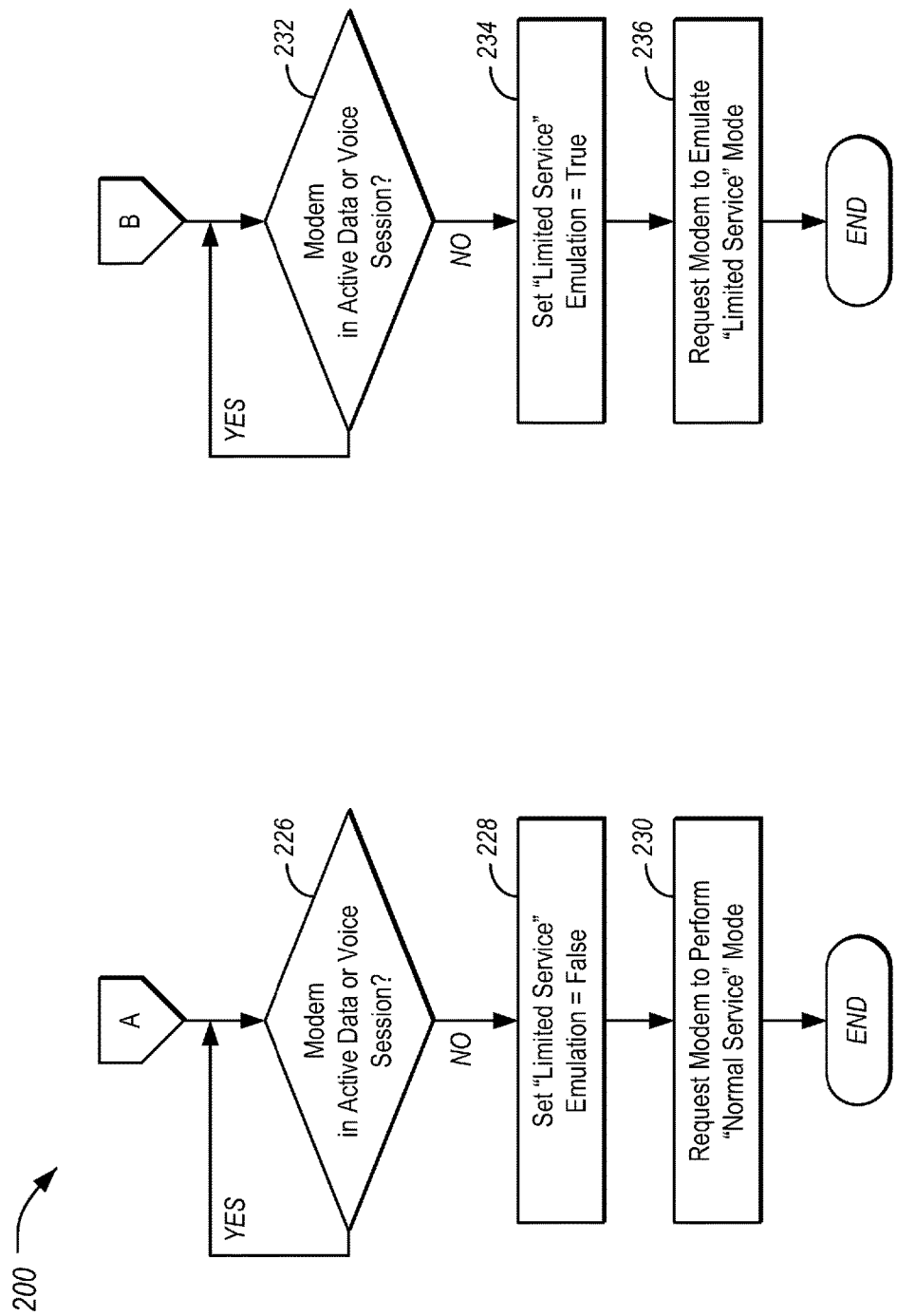
FIG. 2B illustrates an example further portion of the process for implementing a "limited service" mode for telematics services of the vehicle.

FIGS. 2A-2B collectively illustrate an example process 200 for implementing a "limited service" mode for telematics services of the vehicle 102. In an example, the process 200 may be performed by the components of the system 100 discussed in detail with respect to FIG. 1. The process 200 may be initiated responsive to a request or settings change with respect to the "limited service" mode of the modem 114.

At operation 202, as one possibility of initiation of the process 200, a vehicle 102 connectivity setting is changed via the HMI. For example, a user may generate HMI input 132 by selecting a change in the operation mode for the modem 114, e.g., to turn on or off the emulated limited service mode in which user privacy is protected. The APIM controller 104-G receives the HMI input 132 at 204 and sends a vehicle connectivity status signal over the vehicle bus 106 reflecting the new status of the vehicle connectivity, to be received by the TCU 108. At operation 206, the TCU 108 receives the status signal, and the control application 130 processes the signal to determine a value for the "limited service" mode setting.

At operation 208, the control application 130 determines whether the signal indicates that vehicle 102 connectivity is to be turned off. If not, then control passes to operation 210 to set the operation mode DID to "normal service." For example, the control application 130 may utilize the modem API 128 to request an update the value of the "limited service" flag 124 to indicate "normal service." After operation 210, control passes to operation 226 shown on FIG. 2B, discussed in detail below.

If, however, the control application 130 determines at operation 208 that vehicle 102 connectivity is to be turned off, control passes to operation 212 to set the operation mode DID to "limited service." For example, the control application 130 may utilize the modem API 128 to request an update to the value of the "limited service" flag 124 to indicate "limited service." After operation 212, control passes to operation 232 shown on FIG. 2B, discussed in detail below.

At operation 214, as another possibility of initiation of the process 200, the operation mode DID may be changed via a diagnostic tool 112. In an example, a diagnostic tool 112 may be connected to the diagnostic port 110 and may send a diagnostic input 134 to the vehicle bus 106 including the operation mode DID. This message may be received over the vehicle bus 106 by the TCU 108 at 216, where the TCU 108 informs the control application 130 of the DID value change. At 218, the control application 130 processes the new value for the "limited service" mode setting.

If, at operation 220, the control application 130 determines that the operation mode DID is set to "limited service," control passes to operation 232 shown on FIG. 2B, discussed in detail below. Otherwise, control passes to operation 226 shown on FIG. 2B, discussed in detail below.

At operation 222, as yet another possibility of initiation of the process 200, the operation mode DID may be changed via RVCM command 136 received to the TCU 108 over the mobile network 116 from the SDN server 122. This may occur, in an example, responsive to the mobile network 116 determining that the vehicle 102 should not be in service in the area covered by the mobile network 116. At operation 224, the control application 130 extracts the new value for the "limited service" mode setting from the RVCM command 136. After operation 224, control passes to operation 220.

Referring to FIG. 2B, and with continuing reference to FIG. 2A, operation 226 initiates a portion of the process 200 for transitioning to the "normal service" mode. More specifically, at 226 the TCU 108 and/or the modem 114 determines whether there is an active data or voice session. If so, control remains at operation 226 until the session(s) are complete. (In other examples, the TCU 108 may wait up to a maximum amount of time for sessions to complete, such as one minute, five minutes, thirty minutes, or no time at all.) Once all sessions have concluded, control passes to operation 228. At 228, the value of the "limited service" flag 124 is set to indicate that emulation of the "limited service" is to be turned off. At 230, the modem 114 is set to perform in the "normal service" mode, in which the modem 114 connects to the mobile network 116 whenever possible according to the SIM configuration. After operation 228, the process 200 ends.

Operation 232 initiates a portion of the process 200 for transitioning to the emulated "limited service" mode. More specifically, at 232 the TCU 108 and/or the modem 114 determines whether there is an active data or voice session. If so, control remains at operation 232 until the session(s) are complete. (As mentioned above, in other examples the TCU 108 may wait up to a maximum amount of time for sessions to complete, such as one minute, five minutes, thirty minutes, or no time at all.) Once all sessions have concluded, control passes to operation 234. At 234, the value of the "limited service" flag 124 is set to indicate that emulation of the "limited service" is to be turned on. At 236, the modem 114 is set to perform in the emulated "limited service" mode, in which the modem 114 refrains from providing data or voice connectivity outside of emergency services, regardless of the SIM configuration.

In sum, customers, diagnostic tool 112 users, and SDN servers 122 may be provided with a user-friendly way to turn vehicle connectivity off, as well as allowing the customers to turn connectivity back on and use the telematics services with a push of a button.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for a vehicle, comprising:
a modem configured to operate in a normal service mode in which the modem connects to a mobile network whenever possible according to a subscriber identity module (SIM) configuration of the modem, and in an emulated limited service mode in which the modem emulates network conditions of a limited service mode by refraining from providing data or voice connectivity outside of emergency services despite the modem being provisioned for data or voice connectivity; and
a telematics controller programmed to
responsive to receipt of an indication to transition from the normal service mode to the limited service mode, wait for any active data or voice connections to the mobile network to terminate, and
responsive to termination of any active data or voice connections to the mobile network, transition the modem from the normal mode to the emulated limited service mode.

2. The system of claim 1, wherein the indication to transition from the normal service mode to the emulated limited service mode is received from a vehicle human-machine interface.

3. The system of claim 2, wherein the telematics controller is further programmed to:
query the modem for a status of whether the modem is in the normal service mode or the emulated limited service mode, and
send the status to the vehicle human-machine interface for display.

4. The system of claim 3, wherein the vehicle human-machine interface is configured to provide a toggle control for switching between the normal service mode or the emulated limited service mode, and the toggle control is set to the status.

5. The system of claim 1, wherein the indication to transition from the normal service mode to the emulated limited service mode is received from a diagnostic tool connected to a diagnostic port of the vehicle.

6. The system of claim 1, wherein the indication to transition from the normal service mode to the emulated limited service mode is received from a service delivery network service over the mobile network to the telematics controller.

7. The system of claim 1, wherein the telematics controller is further programmed to:
receive a second indication to transition from the emulated limited service mode to the normal service mode, and
responsive to receipt of the second indication, transition the modem from the emulated limited service mode to the normal mode.

8. The system of claim 1, wherein the modem is further configured to:
maintain in non-volatile storage, a value indicative of whether the modem is operating in normal service mode or the emulated limited service mode, and
expose a modem application programming interface (API) from which a first function is exposed to allow the telematics controller to get the value and a second function is exposed to allow the telematics controller to set the value.

9. The system of claim 1, wherein the wait for any active data or voice connections to the mobile network to terminate is capped by a predefined maximum time regardless of whether all active data or voice connections are terminated.

10. A method for a vehicle comprising:
receiving an indication to transition from a normal service mode, in which a modem of a vehicle connects to a mobile network whenever possible according to a subscriber identity module (SIM) configuration, to an emulated limited service mode, in which the modem emulates network conditions of a limited service mode by refraining from providing data or voice connectivity outside of emergency services despite the modem being provisioned for data or voice connectivity;
responsive to receipt of the indication, waiting for any active data or voice connections to the mobile network to terminate; and
responsive to termination of any active data or voice connections to the mobile network, transitioning the modem from the normal mode to the emulated limited service mode.

11. The method of claim 10, further comprising receiving, from a vehicle human-machine interface, the indication to transition from the normal service mode to the emulated limited service mode.

12. The method of claim 11, further comprising:
querying the modem for a status of whether the modem is in the normal mode or the emulated limited service mode, and
sending the status to the vehicle human-machine interface for display.

13. The method of claim 12, further comprising:
providing in the vehicle human-machine interface, a toggle control for switching between the normal service mode or the emulated limited service, and
setting the toggle control to the status.

14. The method of claim 10, further comprising receiving the indication to transition from the normal service mode to the emulated limited service mode from a diagnostic tool connected to a diagnostic port of the vehicle.

15. The method of claim 10, further comprising receiving the indication to transition from the normal service mode to the emulated limited service mode from a service delivery network service over the mobile network.

16. The method of claim 10, further comprising:
receiving a second indication to transition from the emulated limited service mode to the normal service mode, and
responsive to receipt of the second indication, transitioning the modem from the emulated limited service mode to the normal mode.

17. The method of claim 10, further comprising:
maintaining, in non-volatile storage, a value indicative of whether the modem is operating in the normal service mode or the emulated limited service mode, and
exposing a modem application programming interface (API) from which a first function is exposed to allow retrieval of the value and a second function is exposed to allow the setting of the value.

18. The method of claim 10, wherein the wait for any active data or voice connections to the mobile network to terminate is capped by a predefined maximum time regardless of whether all active data or voice connections are terminated.

19. A system comprising:
a modem configured to
maintain in non-volatile storage, a value indicative of whether the modem is operating in a normal service mode in which the modem connects to a mobile network whenever possible according to a subscriber identity module (SIM) configuration or an emulated limited service mode in which the modem emulates network conditions of a limited service mode by refraining from providing data or voice connectivity outside of emergency services despite the modem being provisioned for data or voice connectivity, and
expose a modem application programming interface (API) from which a first function is exposed to allow access to getting the value and a second function is exposed to allow access to setting the value;
a vehicle human-machine interface, including a toggle control for switching between the normal service mode or the emulated limited service, wherein a state of the toggle control is set by the vehicle human-machine interface responsive to a query of the modem API for a status of whether the modem is in the normal service mode or the emulated limited service mode; and
a telematics controller programmed to
receive an indication from the toggle control to transition from the normal service mode to the emulated limited service mode,
responsive to receipt of the indication, wait for any active data or voice connections to the mobile network to terminate, wherein the wait for any active data or voice connections to the mobile network to terminate is capped by a predefined maximum time regardless of whether all active data or voice connections are terminated,
responsive to termination of any active data or voice connections to the mobile network or expiration of the wait, transition the modem from the normal mode to the emulated limited service mode using the modem API,
receive a second indication from the toggle control to transition from the emulated limited service mode to the normal service mode, and
responsive to receipt of the second indication, transition the modem from the emulated limited service mode to the normal mode using the modem API.

* * * * *